United States Patent
Schwieterman et al.

[11] Patent Number: 5,983,936
[45] Date of Patent: Nov. 16, 1999

[54] TORSION SPRING BALANCE ASSEMBLY AND ADJUSTMENT METHOD

[75] Inventors: Mark A. Schwieterman, West Chester; Dale E. Hutchinson, Cincinnati, both of Ohio

[73] Assignee: The Dover Corporation, New York, N.Y.

[21] Appl. No.: 08/873,544

[22] Filed: Jun. 12, 1997

[51] Int. Cl.[6] .................................................. F16L 27/00
[52] U.S. Cl. ............................................................ 137/615
[58] Field of Search .................................... 141/376, 387; 137/615; 251/249.5

[56] References Cited

U.S. PATENT DOCUMENTS

| | | | |
|---|---|---|---|
| 2,737,362 | 3/1956 | Krone et al. | 248/292 |
| 2,739,779 | 3/1956 | Krone et al. | 248/292 |
| 2,749,570 | 6/1956 | Alder | 16/198 |
| 3,038,714 | 6/1962 | Klaus et al. | 267/1 |
| 3,083,400 | 4/1963 | Anderson | 267/1 |
| 3,244,440 | 4/1966 | Ashton et al. | 205/276 |
| 3,378,033 | 4/1968 | Cooley, Jr. | 137/615 |
| 3,458,167 | 7/1969 | Cooley, Jr. | 137/615 |
| 3,489,174 | 1/1970 | Cooley, Jr. | 137/615 |
| 4,111,465 | 9/1978 | Knight | 137/615 |
| 4,533,114 | 8/1985 | Cory et al. | 137/615 |
| 4,537,233 | 8/1985 | Vroonland et al. | 141/387 |

*Primary Examiner*—A. Michael Chambers
*Attorney, Agent, or Firm*—Dinsmore & Shohl LLP

[57] ABSTRACT

A spring tension assembly, which includes a support member for attaching an adjustment assembly to the loading arm. The adjustment assembly can be mounted adjacent the first end of the support member and preferably is configured for engaging the first end of the spring. The adjustment assembly preferably comprises at least two rotatable gears having an interlocked meshed arrangement. An arm assembly can be mounted adjacent the second end of the support member, and configured for engaging the second or other end of the spring. A link arm can have one end attached to the arm assembly and a second end attached to the loading arm.

22 Claims, 7 Drawing Sheets

TORSION SPRING BALANCE ASSEMBLY AND ADJUSTMENT METHOD

TECHNICAL FIELD OF THE INVENTION

The present invention relates generally to spring support assemblies for supporting swivel or loading arms, and more specifically, to a spring support assembly for selectively, accurately and conveniently adjusting the spring tension to counterbalance the loading arm.

BACKGROUND OF THE INVENTION

Spring support assemblies are commonly used on devices such as swivel, or loading or unloading arms, that are used to assist in the transfer of various materials, both wet or dry, from a supply source to a container, tanker car or truck in which material are transported or shipped. Often, loading arms can be quite heavy and can be of considerable length. A spring support assembly generally provides a counterbalance force making it easier to move (e.g., vertically) the loading arm, and align it with the relatively small opening of a container. Since at times a loading arm needs to be handled by a single operator, it is preferable and desired to provide a counterbalance mechanism or assembly that will assist in rapid, easy and accurate placement of the end of the loading arm. Moreover, such counterbalance arrangements also need to be adjustable to properly install, set-up, adapt and/or maintain an arrangement in optimal condition for the particular situation.

One example of a prior spring balance assembly is shown in U.S. Pat. No. 3,038,714 to Klaus, et al. The spring tension can therefore be adjusted (e.g., increased or decreased) by either counter-clockwise or clockwise rotational movement of a spring regulator. This design allows the coil spring to be either tightened or loosened to the degree necessary to sufficiently support or position a loading arm. Some of the prior spring assembly, such as illustrated and disclosed in Klaus, et al., have several shortcomings. For example, to adjust or readjust the spring tension, the loading arm must be supported independently, typically by a crane or other device in order to decouple the loading arm and relieve the spring of its load. Next, a spring keeper must be removed (e.g., manually) from engagement with the spring regulator so that it and the end of the spring can be rotatably adjusted. When the desired position is achieved, the spring keeper is manually inserted back into engagement with the spring regulator so that it does not move. Thereafter, the loading arm is released for normal operations.

In addition to being inconvenient and labor intensive, this complex process of spring tension adjustment can lead to further difficulties in adjusting the spring tension. For example, this apparatus is not reliable, and often requires many "trial and error" attempts to achieve the desired spring tension. Each time the spring tension needs to be adjusted, the above discussed procedures must be followed, which can be cumbersome, time consuming, and typically requires more than one person.

Another prior spring assembly unit, for example, as seen in U.S. Pat. No. 4,537,233 to Vroonland, et al., had a protectively covered spring torsion unit with an assembly of a threaded adjustment screw and barrel nut. In use, the bolt theoretically could be rotated to adjust (e.g., increase or decrease) the spring tension, as the barrel nut moves laterally and alters its effective length along the bolt. As with other prior torsion spring units or assemblies, however, the unit in Vroonland nevertheless still practically requires either a structure for supporting the loading arm, or otherwise maintaining the loading arm in a substantially vertical position in order to relieve the spring coil of its load while the spring tension is being set or adjusted. Attempts to adjust the spring tension by rotating the bolt without supporting the loading arm could easily strip the threads of the adjustment screw, and cause the adjustment unit to fail. Furthermore, the barrel nut moves relative to and laterally along the bolt; and thus, the threaded screw assembly limits rotational movement of a spring regulator to a reduced radial distance.

Often over time, the complexity, difficulties and inconvenience involved in often retensioning the spring sometimes leads to foregoing of this retensioning procedure. As the spring can fatigue and lose its resiliency over time, and therefore the available counterbalancing spring tension is diminished, adjustment and retensioning can be important to maintaining desired optimal functional characteristics of a system. As a result of improperly tensioned arrangements, the loading arm can be inconvenient to utilize, and in some extreme situations, many end up resting on the ground between uses.

As can be appreciated, currently available torsion spring balancing units for counterbalancing a loading arm have a number of shortcomings that contribute to the complexity of the assemblies, difficulty in resetting or adjusting the spring tension, and overall reliability and usefulness of the loading arm equipment in general. There exists a continuing need in the industry for a torsion spring balancing unit that can be adjusted accurately and quickly without otherwise relieving the spring tension while the loading arm is in any position. It is also desirable to provide an improved adjustment assembly that eliminates many of the labor intensive steps currently involved in spring tension set up or adjustment.

SUMMARY OF THE INVENTION

It is an object of the present invention to provide an assembly that addresses and overcomes the above-mentioned problems and shortcoming in the loading arm spring balance industry.

It is yet another object of the present invention to provide an assembly that effectively and reliability eliminates the labor intensive steps involved in adjustment of a spring balance.

Still another object of the present invention is to provide an assembly that does not require the loading arm to be decoupled, supported or held in a vertical position to make an adjustment to the spring tension.

It is yet a further object of the present invention to provide an assembly that includes an integral spring containment feature.

A further object of the present invention is to provide an assembly that can meet a wide range of operating requirements without changing the spring.

Another object of the present invention is to provide an assembly that allows a more full range of spring tension adjustment.

Additional objects, advantages, and other features of the invention will be set forth and will become apparent to those skilled in the art upon examination of the following, or maybe learned with practice of the invention.

To achieve the foregoing and other objects, and in accordance with the purposes herein, the present invention comprises a spring balance assembly for use with a loading arm for adjusting a spring tension. The spring balance assembly includes a support member for attaching an adjustment assembly to the loading conduit, or another suitable surface.

The adjustment assembly can be mounted adjacent the first end of the support member and preferably is configured for engaging the first end of the spring. The adjustment assembly preferably comprises at least two rotatable gears having an interlocking meshed arrangement. An arm assembly is mounted adjacent the second end of the support member, and configured for engaging the second or other end of the spring. A link arm can have one end attached to the arm assembly and a second end attached to the loading arm.

In a preferred embodiment, the adjustment assembly is a gear train comprising a first gear, such as a worm, rotatably mounted relative to the support member, and a second gear, such as a disc shaped gear with a plurality of teeth on its radial face (e.g., worm gear), also rotatably mounted relative to the support member. The first and second gears are configured to remain in constant engagement in an interlocking meshed arrangement while being rotatable relative to the support member. The first gear preferably includes an adjustment head configured for use with a tool to adjust conveniently the tension of the spring. Ideally, the present invention is configured so that the first end of the spring can be adjusted in infinitely small increments, or alternatively in predetermined increments. The second gear can be provided with teeth extending around substantially the entire periphery of its radial surface, or only partially around the periphery of its radial surface. In either embodiment, the second gear may include a stop mechanism for preventing further rotation of the second gear beyond either the teeth, or a predetermined radial distance.

The spring balance assembly also preferably includes a retainer rod longitudinally extending between the adjustment assembly and the arm assembly within the coils of the spring. A preferred embodiment of the support member includes a support having two brackets that are laterally spaced along the support plate and generally rearwardly projecting away from the loading arm, in use.

A sleeve may be attached to the support member, and configured for covering the adjustment assembly. Alternatively, a cover for covering both the adjustment assembly and the spring can be used with the adjustment assembly.

BRIEF DESCRIPTION OF THE DRAWINGS

While the specification concludes with claims particularly pointing and distinctly claiming the present invention, it is believed the same will be better understood from the following description taken in conjunction with the accompanying drawings in which:

DETAILED DESCRIPTION OF THE PREFERRED EMBODIMENTS

Figure 1:
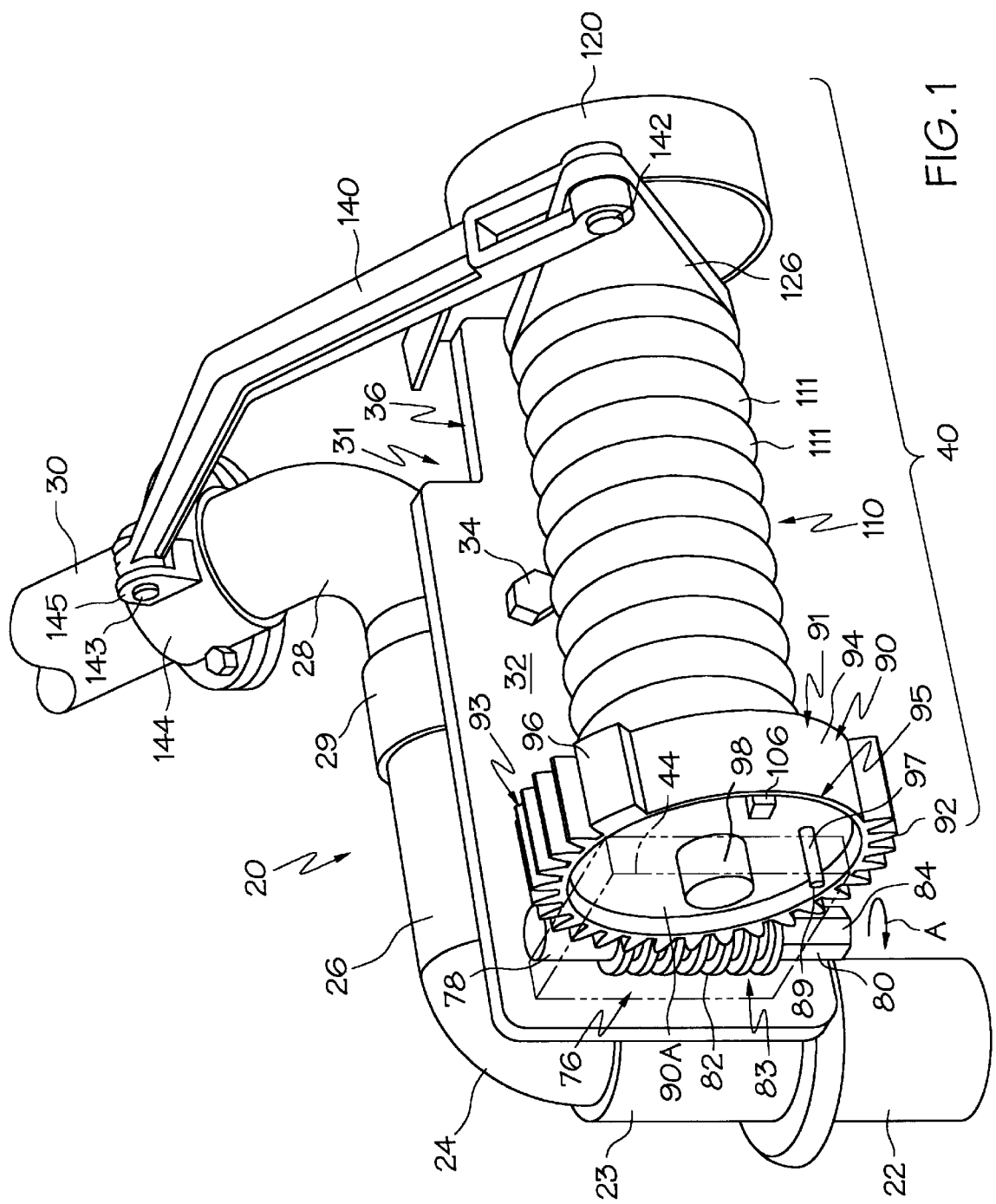
FIG. 1 is a perspective view of a preferred embodiment of a loading arm assembly made in accordance with the present invention.

Referring now to the drawing figures in detail, wherein like numerals indicate the same elements throughout the views, FIG. 1 illustrates an exemplary loading conduit 20, which might be used, for example, in the petroleum or chemical industry for the transfer of wet or dry materials from a storage supply to a container or tank, or the like. As will be appreciated by those skilled in the industry, an overhead supply system or loading conduit, such as exemplified in the drawing figures and discussed herein, can be used in any other of a variety of other industries as well for the transfer of materials or fluids.

Typically, the loading conduit 20 may include a vertical pipe 22 connected in fluid communication with a horizontal pipe 26 by means of a elbow joint 24, and that can allow for the horizontal movement (e.g., rotation about swivel junction 23) of the horizontal pipe 26. It should be noted that the vertical pipe 22 is illustrated in FIG. 1 as a riser pipe; however, it is contemplated in some embodiments that the vertical pipe 22 could be a "downcomer" pipe, or could be oriented in essentially any attitude. The horizontal pipe 26 can be, in turn, connected to and in fluid communication with a swing or loading arm 30 by means of another elbow joint 28, and which can assist in enabling vertical movement (e.g., rotation about swivel junction 29) of the loading arm 30, as will be discussed in greater detail later. Although not illustrated, the loading arm 30 can be pivotally connected to and placed in fluid communication with a spout member or drop pipe which remains in essentially a vertical position during manipulation (e.g., raising or lowering) of the loading arm 30 to assist in filling a container, storage tank, etc. The spout member can be optionally equipped with a manipulation control or faucet valve (also not shown), by which flow of material or fluid can be controlled.

Figure 2:
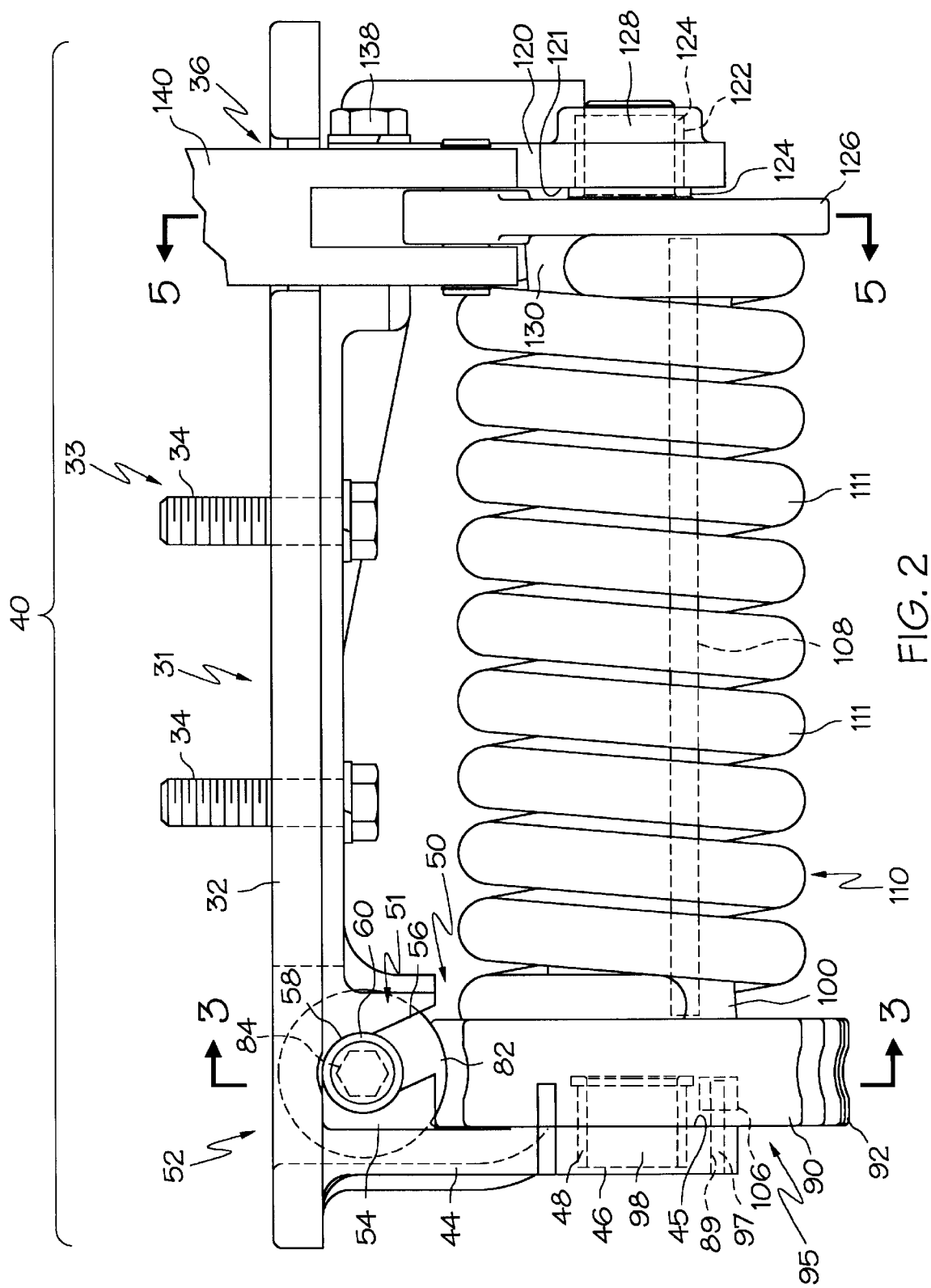
FIG. 2 is a partial top plan view of the torsion spring balance assembly of FIG. 1.
Figure 3:
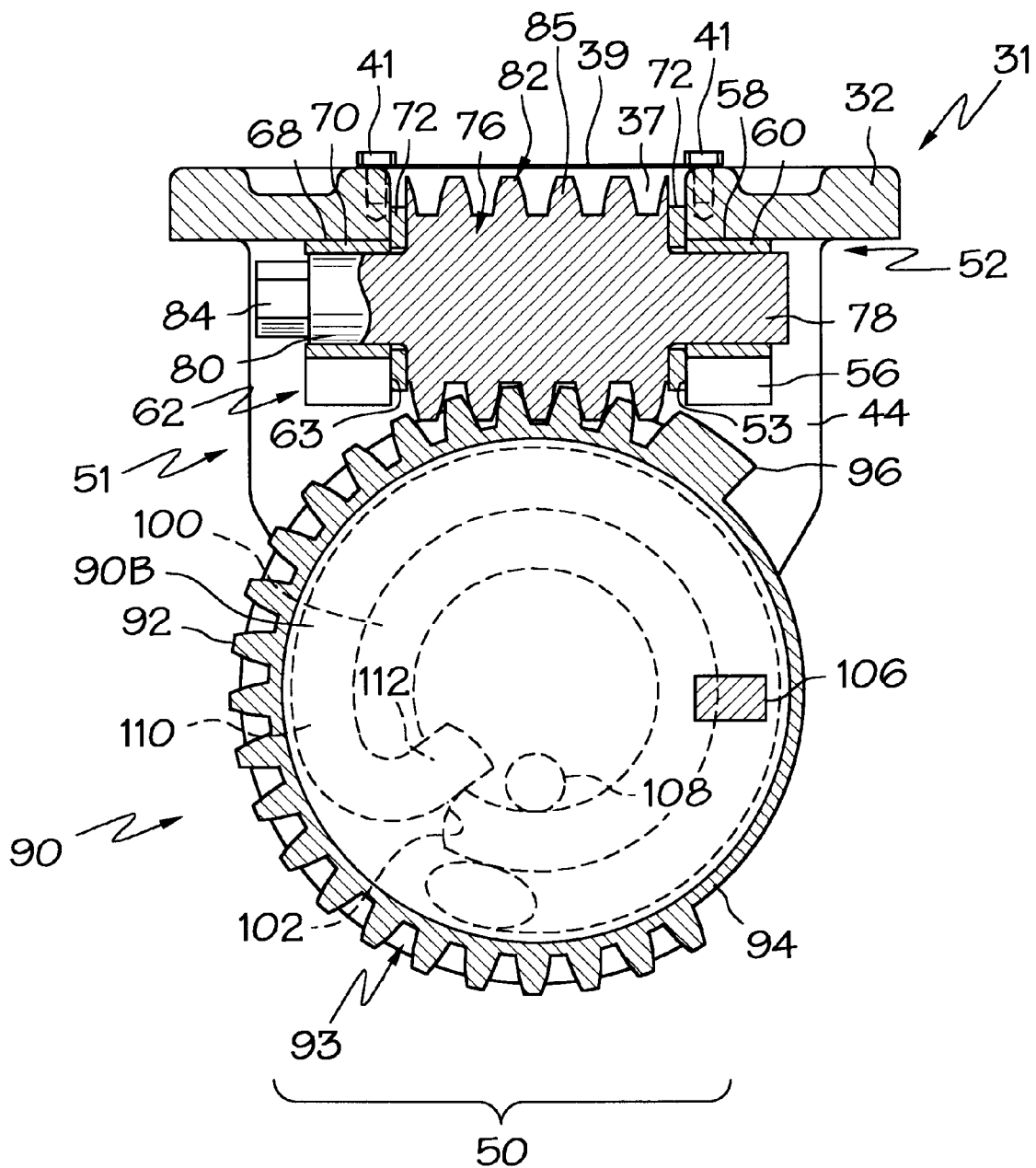
FIG. 3 is the vertical cross-sectional view of the unit of FIG. 2, taken along line 3—3 thereof, illustrating a portion of the adjustment assembly.

A torsion spring balance assembly 40 made in accordance with the present invention can include an attachment assembly 31 for mounting the torsion spring balance assembly 40 to the loading conduit 20. Turning now to FIGS. 2 and 3, a first gear 76 preferably is mounted in a support structure 51, and a second gear 90 can be mounted adjacent bracket 44. A retainer rod 108 preferably is inserted between the coils 111 of the spring 110. The spring 110 is coupled to the gear 90 and to the spring arm 126. The spring arm 126 is mounted to the other end of the attachment assembly 31 using a bracket 120 that can be affixed to the support plate 32. The spring arm 126 is illustrated as being attached pivotally to the loading arm 30 using a link arm 140.

Turning now to FIGS. 1 and 2, the torsion spring balance assembly 40, as mentioned above, can be mounted to the loading conduit 20 by means of an attachment assembly 31. It should be noted that while it is preferred for simplicity and independence that the spring balance assembly 40 be mounted to the loading conduit 20, it is contemplated that attachment assembly 31 could also be attached to any suitable surface which is effectively immovable (e.g., non-rotating) relative to the loading conduit 20. Attachment assembly 31 is exemplified as including a support plate 32, that may be preferably removably attached to the loading conduit 20, such as to the horizontal pipe 26, using a securing mechanism 33 such as a series of bolts (see e.g. 34 in FIGS. 1 and 2) that can be inserted into lugs (not shown)

provided in the horizontal pipe 26, and/or using a C-clamp or other support bracket arrangement (not shown). Alternatively, the support plate 32 could be secured more permanently to the loading conduit 20 or other suitable surface, such as by welding it thereto.

The torsion spring balance assembly 40 can feature a bracket 44 to assist in supporting the adjustment assembly 50, and in adjusting the tension of spring 110. The bracket 44, and oppositely disposed bracket 120, as will be discussed in greater detail later, preferably might project outwardly from the support plate 32, and are laterally spaced from each other. Furthermore, the bracket 44 can be integrally formed with the support plate 32, can be welded thereto, or can be otherwise releasably attached (e.g., using bolts) to the support plate 32. A bushing 46 or other recess is shown as being formed on the inside surface 45 of the bracket 44 (i.e., the surface facing gear 90) for receiving either a stub shaft 98, or a bearing 48 for use with the stub shaft 98, as will be discussed later.

As best illustrated in FIG. 3, the adjustment assembly 50 of the present invention features a train or combination of a plurality of intermeshed gears, such as gear 76 and a rotatable gear 90 configured to enable substantially constant and consistent engagement with each other, preferably in an interlocked meshed arrangement. The interlocked meshed arrangement enables the adjustment assembly 50 to adjust the counterbalance force (e.g., spring tension) in either infinitely small increments, or in predefined adjustment preset increments (e.g., from about 1/16 inches to about 1/2 inches) (0.159 to 1.27 cm). The adjustment assembly 50 is configured with a low lead angle, and is generally investment casted without substantial machining so that the interlocked meshed surfaces are relatively rough. Gear 90 effectively remains in its adjusted or set position relative to the gear 76, whereby once set in the desired position, it will not change, "unwind" or backdrive. It is contemplated that a ball bearing arrangement for further preventing backdriving can be provided adjacent the adjustment assembly 50. Furthermore, and as best illustrated in FIGS. 1 and 2, gear 76 and gear 90 are preferably mounted to the attachment assembly 31 such that they are fixed in a predetermined rotatable position relative to each other and the balance of the torsion spring balance assembly 40, and remain in that predetermined position as they are rotated to adjust the tension of spring 110.

As mentioned above, intermeshing the gear surfaces in such a predetermined position relative to each other and the spring balance assembly 40 not only enables adjustment of the tension of spring 110 without a need to disengage or otherwise support or immobilize the loading arm 30 itself, but also minimizes the moving parts and simplifies the design while improving convenience, reliability and adjustment accuracy.

The gear 76 exemplified in FIG. 3 is a worm, and is illustrated as featuring first and second ends 78 and 80, respectively, a toothed section or portion 82. An adjustment head 84 can be integrally casted as part of the gear 76 adjacent one of the ends (e.g., 78 or 80). Alternatively, the adjustment head 84 can be removably mounted adjacent one of the ends (e.g., 78 or 80), and can be exchanged with other sized adjustment heads if desired. In the exemplified embodiment, the adjustment head 84 is integral with the gear 76 and is formed adjacent the lower or second end 80.

As mentioned above, the toothed section 82 preferably can be configured to constantly engage a gear (e.g., worm gear 90) and to assist in adjusting the tension of spring 110. The lead angle of the toothed section 82 should be selected to facilitate adjustment of the tension of spring 110. One suitable gear 76 would feature the teeth 85 having a depth between the top and bottom land of about 0.37 inches (0.931 cm), a pitch diameter of about 2 inches (5.08 cm), a lead angle less than 11 degrees, and preferably about 4.5 degrees, and a pressure angle from about 14.5 degrees to about 25 degrees, and preferably about 14.5 degrees.

The adjustment head 84 provided adjacent one end (see, e.g., the second end 80) preferably can be sized and configured to receive a standard sized, either English or metric, adjustment tool, such as a socket wrench head to enable adjustment of the tension of spring 110. One suitable example would include a 5/8 inch hex or octagonal adjustment head 84 that can receive a suitably sized socket wrench or other tool.

The gear 76 preferably can be mounted in or supported by the support structure 51, so that it can rotate relative to the support structure 51. Preferably, the support structure 51 can be integrally formed with the support plate 32, or alternatively, may be attached thereto. In the preferred arrangement, the upper support structure 52 features an opening 66 (see FIG. 2) that leads to a recessed bushing 58, while the lower support structure 62 also features an opening 66 leading to another recessed bushing 68. Both support structures (52 and 62) are configured for rotatably supporting a gear 76. An opening 37 is preferably provided in the support plate 32 to accommodate the teeth (e.g., 82) of gear 76 without interference. A cover plate 39 for protecting the worm gear 76 can be mounted over the opening 37 and secured to the support plate 32 using any suitable attachment mechanism (see, e.g., bolts 41 in FIG. 3).

Bearings 60 and 70, such as bronze bearings, may be used in bushings 58 and 68, respectively, and would be configured to receive the first and second ends 78 and 80, respectively. Use of bearings 60 and 70 also assists in supporting the ends 78 and 80 during rotational movement of gear 76, and in providing a more reliable and uniform performance of the adjustment assembly 50 over time. A high strength washer 72, such as a zinc plated washer, can be inserted around the first and second ends 70 and 80, respectively, so that the teeth 82 do not interfere with or wear against the top surface 63 of the lower support structure 62, or the lower surface 53 of the upper support structure 52, and to assist in further reducing friction during rotation of the gear 76, in use.

As mentioned above, the adjustment assembly 50 can include a gear 90, which is exemplified in the drawing figures as a disc shaped toothed wheel or worm gear to correspond with the exemplary worm 76 discussed above. One side or axial face 90A of the gear 90, as exemplified in FIG. 2, can include a stub shaft 98 that can be sized and configured to be received in the bushing 46, or alternatively within the bearing 48, and should be rotatable relative to the bracket 44. For example, a bronze bearing 48 can be used to help support the stub shaft 98, and to help reduce friction during rotational movement of the gear 90.

The teeth 92 may only extend partially around the periphery of radial surface 91 of the gear 90. This embodiment also can include a non-toothed surface 94 on the periphery of the radial surface 91. To assist in maintaining constant engagement between the gears 76 and 90, respectively, and to ultimately and positively limit the extend or stroke of available adjustability of a spring balance assembly 40 of the present invention, a stop mechanism 95 can be provided so that the teeth 92 of the gear 90 do not become disengaged from the gear 76. An exemplar stop mechanism 95 may include a block portion 96 provided on the radial surface 91 of the gear 90 adjacent the end of the teeth 92 so that upon contact with block portion 96 with worm 76, gear 90 cannot rotate any further. The stop mechanism 95 can further include a shaft 97 (e.g., a ⅜ inch diameter dowel pin) that is configured such that it can be inserted into a bore 89, and extends outwardly from the surface 45 of bracket 44. A projection 106 is provided on face 90A of the gear 90 so that as the gear 90 rotates, eventually projection 106 will contact the shaft 97, and whereby the gear 90 can not rotate any further.

Figure 8:
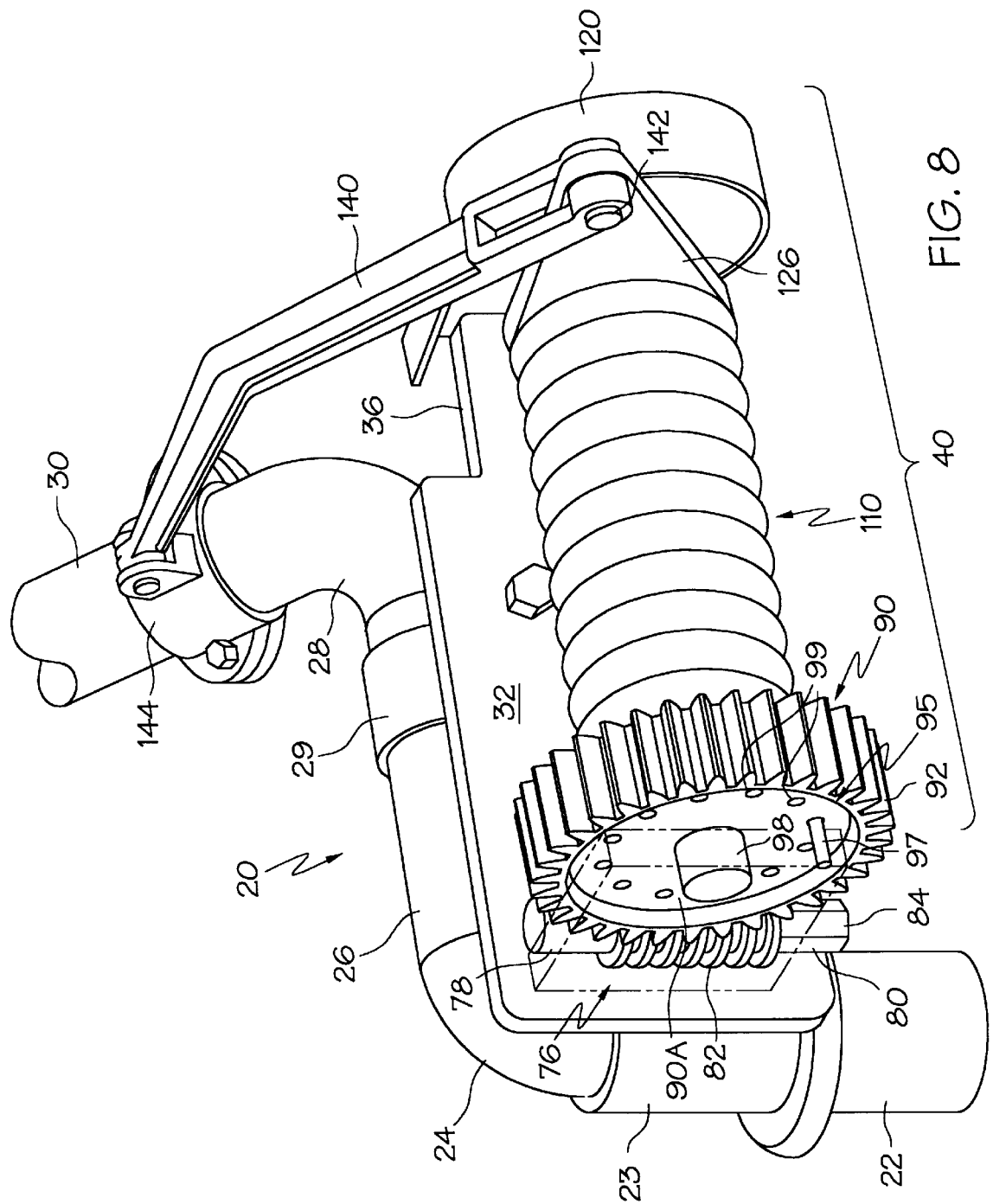
FIG. 8 is a perspective view of an alternative embodiment of a loading arm assembly made in accordance with the present invention.

In an alternative embodiment, a plurality of teeth 92 can extend around the entire periphery of the radial surface 91 of gear 90, as exemplified in FIG. 8, that allows for infinite rotation of gear 90; and thus, infinite adjustment of the tension of spring 110. A stop mechanism 95 can also be provided with this alternative embodiment to limit the available stroke of available adjustability of the spring balancing assembly 40. A plurality of bushing like attachments 99 can be provided in the face 90A of the gear 90 to receive a shaft similar to shaft 97 in FIG. 1. Upon contact between the shaft 97 and bracket 44, gear 90 can not rotate any further. It is further contemplated that shaft 97 can be inserted in more than one attachment 99 to provide a clockwise and counterclockwise stop mechanism, which would reduce the rotational motion range of gear 90.

The depth, bottom land and overall configuration of the teeth 92 should be provided to correspond with and be interlockingly received in a meshed arrangement the toothed section 82 of gear 76. One suitable example of a worm gear 90 would be configured to include a lead angle less than about 11 degrees, and preferably about 4.5 degrees, a pressure angle from about 14.5 to about 25 degrees, and preferably about 14.5 degrees, a tooth depth of about 0.37 inches (0.931 cm), and a pitch diameter of about 5.5 inches (13.97 cm).

The other side 90B of the gear 90 (i.e., the side that faces away from the bracket 44), as best seen in FIG. 3, may include a generally annular shaped raised portion or hub 100 with a spring retention element 102, such as a break or slot therein, that is preferably adapted to receive and couple the first end 112 of a tension spring 110 to gear 90. The spring ends 112 and 114, respectively, can be configured (e.g., bent) in such a way, such as in a coupling hook orientation, so as to fit into the spring retention elements 102, 132, respectively, for an immovable connection. The attachment of the second end 114 of spring 110 to the spring arm 126 is exemplified in FIG. 5.

As will be appreciated by those skilled in the industry, the exemplary worm gear arrangement can be interchanged with other styles and configurations of gear trains and assemblies that can be rotated and remain in a constant interlocked meshed arrangement with a gear (e.g., 90) to assist in adjusting the tension of spring 110. For example, a spur gear arrangement of two or more annular shaped gear can be used with the present invention as adjustment assembly 50. Alternatively, a beveled gear arrangement could be used as well. A helical gear arrangement also is contemplated and would be suitable for uses involving heavier loading arms (e.g., 30) since the teeth of this gear train come together at acute angles.

Returning now to FIG. 2, a retainer rod 108, preferably made of steel or other strong material, may be provided within the coils 111 spring 110 and disposed between the bracket 44 and spring arm 126. If the spring 110 should break or catastrophically fail, the retaining rod 108 should be sufficiently strong and positioned therein to effectively prevent the spring 110 from becoming disengaged from the adjustment assembly 50. Retainer rod 108 with its spring retaining features obviate the need for a protective housing that covers the spring 110 to retain the spring 110 in the event of an unlikely breakage or other spring failure.

As mentioned above, the torsion spring balance assembly 40 can include a relatively heavy spring, such as a spirally convolute counterbalancing or tension spring 110. Preferably, the spring 110 is made of a material such as steel or other metal, or material capable of providing tension force to assist in providing a sufficient counterbalance force for the loading arm 30. It is contemplated that springs (e.g., 110) having varying wire diameters, such as from about ¹¹⁄₁₆" (1.75 cm) to about 1 inch (2.54 cm) or more can be used with the present invention. Suitable springs should have a load capacity from about 200 ft.-lbs (27.5 kg-meters) to about 3000 ft.-lbs. (415 kg-meters) for typical applications such as petroleum or chemical material transfer.

Figure 4:
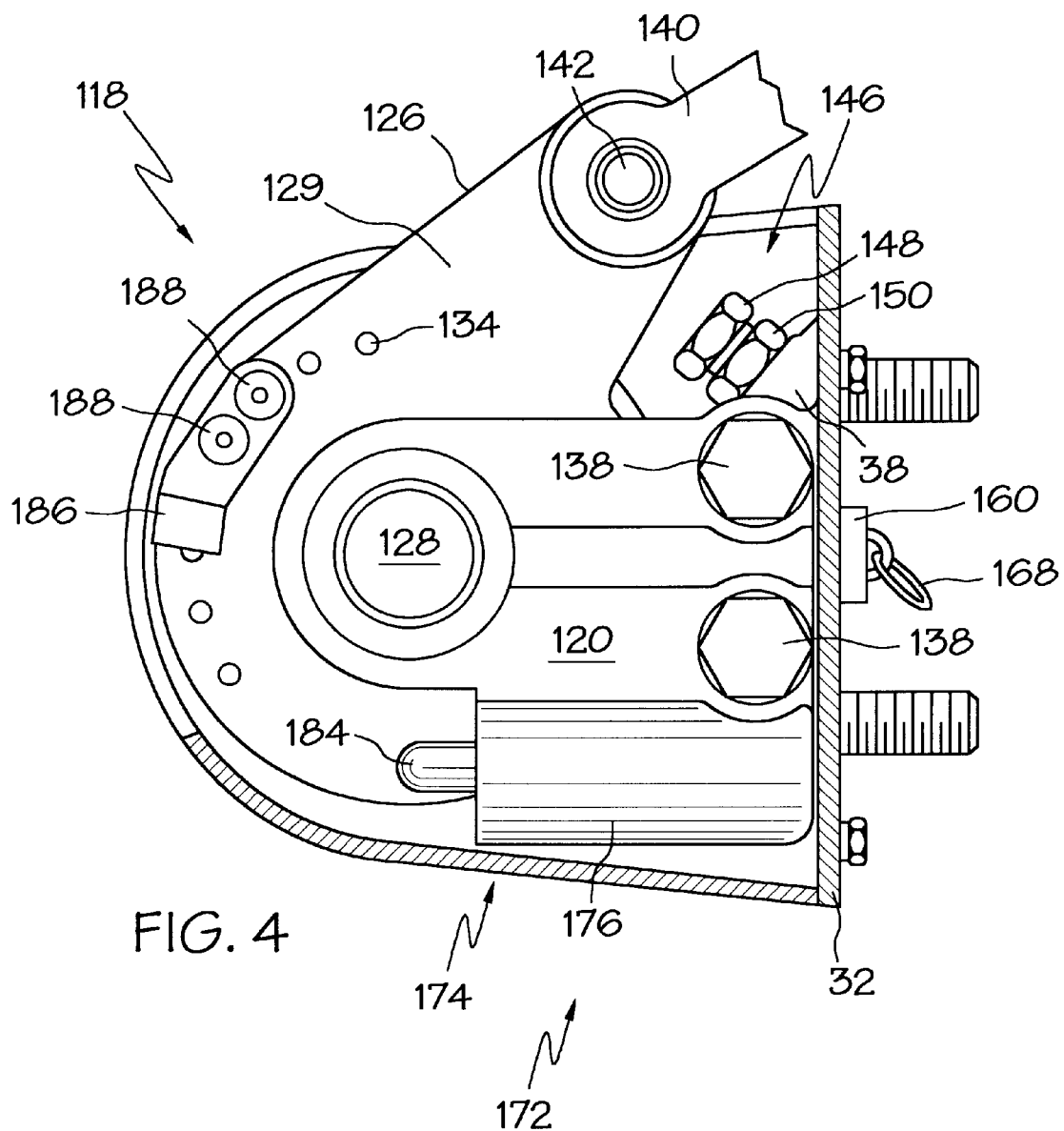
FIG. 4 is a right side elevational view of the unit of FIG. 1.
Figure 5:
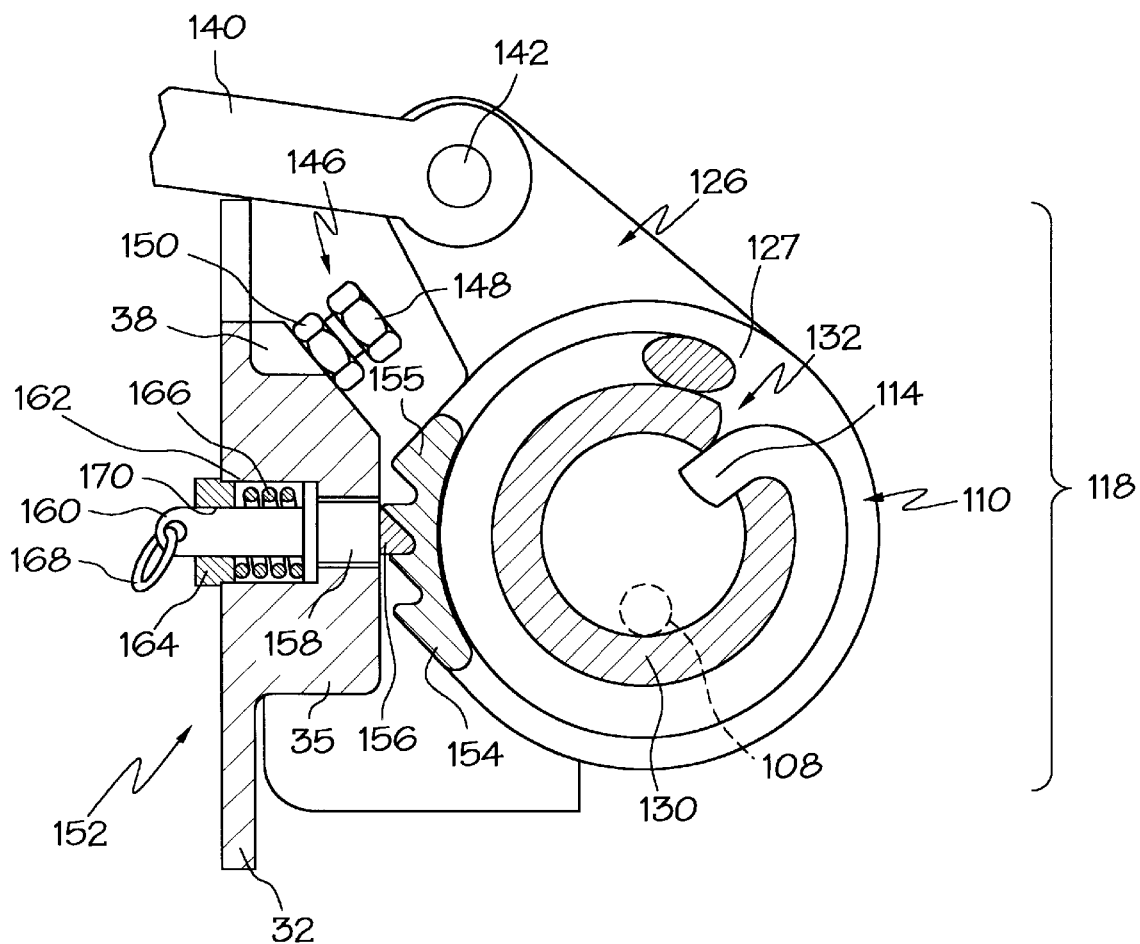
FIG. 5 is another vertical cross-sectional view of the unit of FIG. 2, taken along line 5—5 thereof, illustrating a portion of the spring arm.

Turning now to FIG. 5, the torsion spring balance assembly 40 further can include an arm assembly 118 having a spring arm 126. One side or surface 127 of the spring arm 126 (i.e., the side that faces away from the bracket 120) can include a generally annular shaped, inwardly directed raised portion or hub 130, that can be similarly configured as was exemplar hub 100, as discussed above, and is illustrated as including a spring retention element or slot 132 to receive, and couple the second end 114 of a tension spring 110 to the spring arm 126 and also to loading arm 30 to be balanced. In this way, it will be understood that the spring 110 can be supported between the oppositely disposed gear 90 and the spring arm 126 on the hubs 100 and 130, respectively. FIG. 4 illustrates the other side 129 of the spring arm 126 (i.e., the surface that faces toward the bracket 120) as having a generally annular shaped stub shaft 128 that generally is sized and configured to be received rotatably in the bushing 122 of the bracket 120, or another suitably configured bearing 124.

As discussed above, the torsion spring balance assembly 40 also can feature a second bracket 120 for assisting in supporting the torsion spring balance assembly 40. The bracket 120 can be either integrally formed with the support plate 32, can be welded thereto, or can be otherwise releasably attached (e.g., using bolts, such as those exemplified as 138 in FIGS. 2 and 4). One of the brackets 44 or 120 preferably should be releasably attached to the support plate 32 so that the adjustment assembly 50, retaining rod 108, and spring 110 can be assembled, or so that the torsion spring 110 can be replaced or interchanged, as desired.

The bracket 120 can include a bushing 122 formed in the inner surface 121 (i.e., the surface facing the spring arm 126) that may be sized and configured to receive a bearing 124, such as a bronze bearing. Bearing 124 can be used to assist in supporting the hub 130, and to assist in reducing friction during rotation of the spring arm 126, in use.

The exemplified spring arm 126 in FIG. 1 can be attached to the loading arm 30 by means of a link arm 140 which will preferably be pivotally connected to the spring arm 126 by a pivot pin 142. The other end of the link arm 140 is shown as being pivotally connected to the loading arm 30 by a suitable means such as a pivot pin 143 connected to the ears 145 of an adjustable clamp 144. A clearance notch or cut-out 36 can be provided in the support plate 32 to provide sufficient clearance for the link arm 140 when the loading arm 30 is at a lower position. It is contemplated that the structure should provide at least a 130 degree range of motion for the loading arm 30 relative to the support plate 32. It is contemplated that the support plate 32 can include a second similarly configured clearance notch or cut-out on the opposite (e.g., bottom or lower) side of the support plate 32 (not shown), such as the one exemplified as 36, so that the same support plate 32 can be used with either a left handed or right handed set up or arrangement.

Generally, torsion springs (e.g., 110) have a moment transmitted through various elements of the assembly, such as the spring arm 126 and loading arm 30 to the spring 110. This moment creates a torque which increases as the loading arm 30 is lowered, and/or extended. The actual moment to the spring arm 126 and link arm 140 is a function of the moment created by the adjustment assembly 50 and the loading arm 30. The geometry should be such that the support provided by the adjustment assembly 50 to the loading arm 30 is nearly equal to and opposite to all positions for the full range of movement of the loading arm 30.

FIG. 5 illustrates that the spring arm 126 optimally may be provided with a locking structure 152 for supporting the loading arm 30 in any of a plurality of desired substantially vertical positions. The locking assembly 152 assists in fixing the position of the loading arm 30 so that the loading arm 30 does not unexpectedly or suddenly break or disengage its connection with a tank or other container being filled by the loading conduit 20. A toothed member 154 is exemplified as being an integral part of the spring arm 126, and having a plurality of notches or teeth 155, or other projections sized and shaped for engagement with a latch (e.g., 156). It is contemplated that the toothed member 154 alternatively may be bolted or welded to the spring arm 126. In use, the toothed member 154 may be engaged by a resiliently actuated latch 156 on a plunger 158 with a shaft 160, located in the bore 162 in an enlarged portion 35 of the support plate 32 for assisting in holding or supporting the loading arm 30.

A keeper element or plug 164 may be provided that can be toothed or otherwise affixed into the end of the bore 162, and includes an opening 170 for the laterally reciprocating passage of the shaft 160. A spring, such as compression spring 166 as exemplified in FIG. 5, can provide a bias between the keeper element 164 and the plunger 158. When the spring arm 126 is adjusted, it will be locked into various positions by coaction of the latch 156 with notches 155 of the toothed member 154. To release the swing arm 126 from its set or locked position, the latch 156 may be disengaged from the toothed member 154 by pulling on a ring 168 affixed to the shaft 160, or by utilizing a levered assembly pivotally attached to the support plate 32 and the shaft 60 (not shown).

Figure 6:
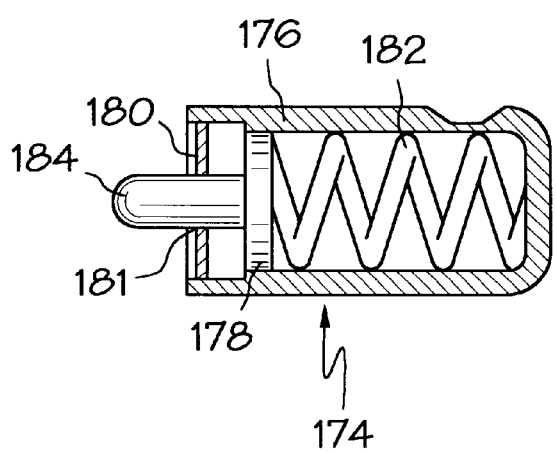
FIG. 6. is a partial sectional view of the snubber of FIG. 4.

To reduce the possibility of damage to the spring 110 during its release from a downward locked position, which can sometimes be violent and sudden, an upward stop assembly 172 also optimally can be provided, as exemplified in FIGS. 4 and 6. A spring loaded snubber 174, exemplified best in FIG. 6, for assisting in dampening the generally upward movement of the spring arm 126, generally can feature a cylinder 176, that may be integrally affixed to the bracket 120, or otherwise attached thereto using any suitable means (e.g., bolts or welding), and a piston 178. A snubber nose 184 or other suitable device can be affixed to a piston 178 and may extend generally longitudinally through a suitably sized and configured keeper element or plug 180 for preventing the piston 178 from becoming removed from the cylinder 176. A spring, such as a compression spring 182, may be positioned between the bottom of the cylinder 176 and the piston head 178.

The upward travel stop assembly 172 further can feature a snubbing block 186 or other mechanism that can be releasably affixed to the spring arm 126. As illustrated, the spring arm 126 includes a plurality of holes 134 for adjusting and positioning the snubbing block 186 at various positions along the spring arm 126, which in turn, assists in adjusting the upward travel stop assembly 172 of the spring arm 126. Attachment means, such as bolts 188 exemplified in FIG. 4, or screws, can be used to releasably secure the snubbing block 186 to the spring arm 126. As will be appreciated, attaching the snubbing block 186 on the spring arm 126 near the pivot pin 142 of the link 140 can allow for more generally upward travel of the spring arm 126. In contrast, and as would be expected, attaching the snubbing block 186 on the spring arm 126 away from the pivot pin 142 will assist in decreasing the upward travel of the spring arm 126. The upward movement of the loading arm 30 can be terminated, without substantial shock, by enabling the coaction of the snubbing block 186 against the spring loaded snubber nose 184.

In addition to an upward travel stop assembly 172, the torsion spring balance assembly 40 of the present invention can feature a lower or downward travel stop mechanism 146. As exemplified in FIGS. 4 and 5, the downward travel stop mechanism 146 may include an adjustable screw stop 148 on a raised portion 38 of the support plate 32 having a locking nut 150. The screw stop 148 of the exemplified embodiment can provide an abutment to prevent further downward movement or rotation of the spring arm 126.

Figure 7:
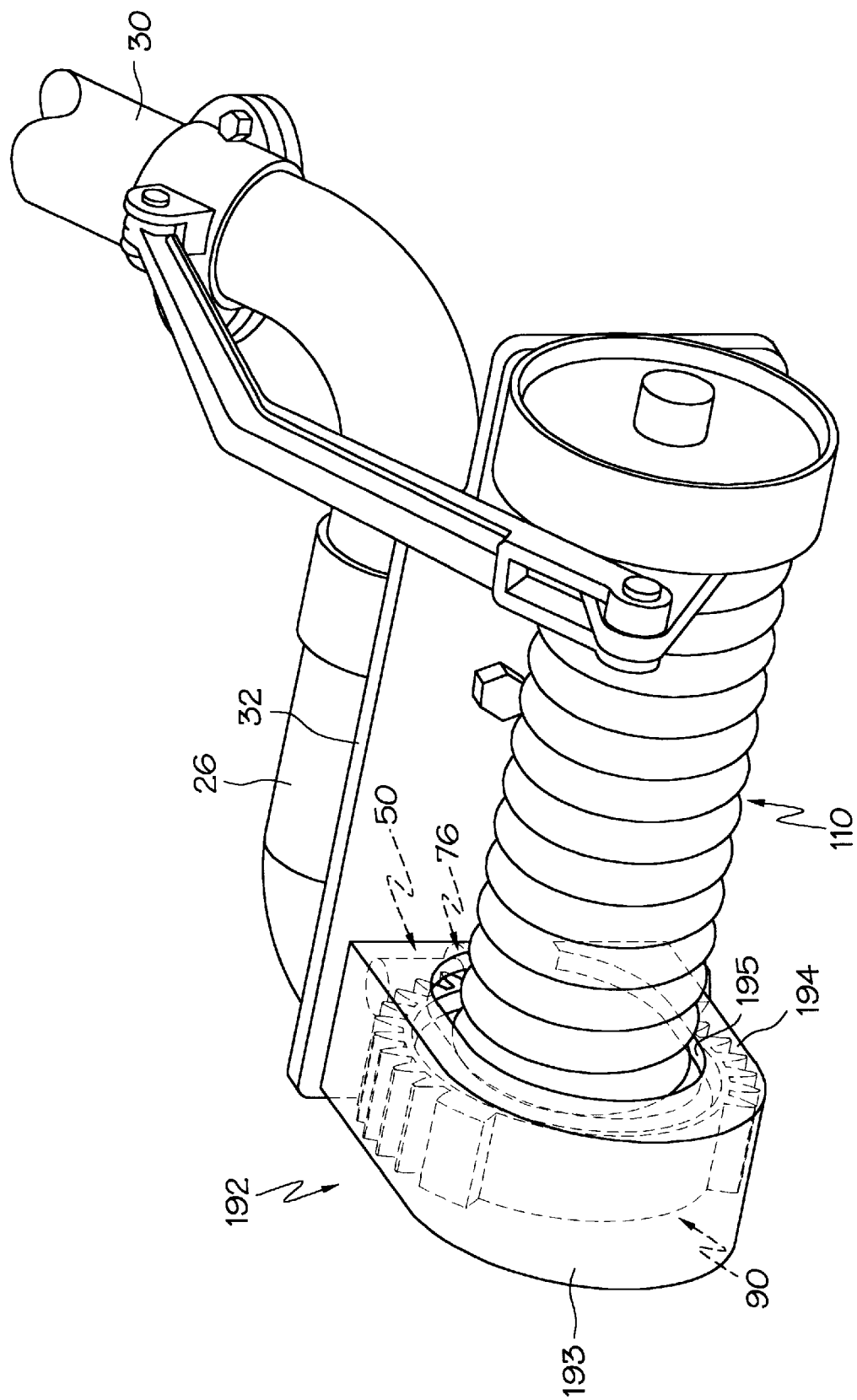
FIG. 7 is a perspective view illustrating an adjustment assembly comprising a sleeve.

FIG. 7 exemplifies the adjustment assembly 50 being covered or encased by a sleeve 192. The sleeve 192 is detachably mounted to the attachment assembly 31, such as at the edge of the support plate 32 using any suitable means known in the industry, such as screws or bolts. In an alternative embodiment, a snap lock mechanism could also be implemented and used to attach the sleeve 192 to the support plate 32. The sleeve 192 generally features a body portion 193 that extends around the gears 76 and 90. An optional skirt 194 and a closed lip 195 may be provided to further cover the inner face 90B of the gear 90 and gear 76. A polyethylene plastic is preferably used for the sleeve 192, however, other materials may be selected and used.

Alternatively, a cover (not shown) may be provided that protects both the adjustment assembly 50 and the spring 110. An embodiment using the cover also may be releasably attached to the attachment assembly 31, preferably along the edges of the support plate 32, using any suitable means known in the industry so that it can be removed to replace the spring 110 if necessary. As will be appreciated by those in the industry, generally a slot shaped cut-out portion can be provided in a cover to provide sufficient clearance for movement of the link arm 140 as loading arm 30 is being moved or adjusted.

To adjust the height of the loading arm 30, or to adjust the tension of spring 110, a properly sized and configured tool, such a socket wrench, is placed on the adjustment head 84. In the exemplified right handed adjustment assembly 50, a clockwise turn of the adjustment head 84 (see arrow "A" in FIG. 1) will rotate the gear 76. The interlocked meshed teeth arrangement of the gear train (e.g., gears 76 and 90) will cause the teeth 82 of gear 76 to slide across the teeth 92 of gear 90 causing rotational movement of the gear 90 and thus, rotatably moving the end 112 of the spring 110 affixed to the gear 90. Tightening the spring 110 will generally increase the torque of spring 110. In contrast, a counterclockwise turn of the adjustment head 84 in the exemplified embodiment generally will decrease the torque of the spring 110. Once the tool is removed from the adjustment head 84, the lifting action of the loading arm 30 can be tested. The adjustment of the tension of spring 110, as discussed above, can be done while loading arm 30 is in a counterbalancing engagement with the spring balancing assembly 40.

It is also contemplated that in lieu of manual adjustment of the tension of spring 110 with a tool, a motor driven unit (not shown), such as a servo motor, optionally with a feedback system, or a remote control system for adjusting the tension of spring 110 from a remote location, can be connected to the adjustment head 84 and can assist in facilitating adjustment of the tension of spring 110.

Having shown and described several preferred embodiments of the present invention in detail, it will be apparent that modifications and variations by one of ordinary skill in the art are possible without departing from the scope of the present invention defined in the appended claims. Several potential modifications have been mentioned and others will be apparent to those skilled in the art. The present embodiments being discussed and exemplified, both in the written description and drawing figures, are for use with a right handed spring. Nevertheless, it is contemplated that a left handed spring could be used with the present invention if the loading conduit 20 is set up opposite from how illustrated in the drawing figures. Furthermore, it is contemplated that either a single or double enveloping worm gear arrangement can be used in the adjustment assembly 50 with the present invention. Accordingly, the scope of the present invention should be considered in terms of the following claims and is understood not to be limited to the details of structure and operation shown and described in the specification and drawings.

We claim:

1. A method for adjusting the tension of a spring balance assembly, comprising the steps of:
   (A) providing a loading arm;
   (B) providing a spring torsion balance assembly comprising a first and second gear in an intermeshed arrangement;
   (C) maintaining the gears in an interlocked meshed condition;
   (D) connecting said torsion spring balance assembly in a counterbalancing engagement with said loading arm;
   (E) rotating said gears to adjust the tension in said spring while said gears and spring remain connected to said loading arm in a counterbalancing engagement.

2. The method of claim 1, wherein said gear arrangement is provided in the form of a worm and worm gear train, and said step of rotating is implemented via said worm.

3. A spring balance assembly for use with a loading arm for adjusting a spring tension, said spring balance assembly comprising:
   a support member having a first and second end;
   a spring having a first and second end;
   an adjustment assembly mounted adjacent the first end of the support member and configured for engaging the first end of the spring, said adjustment assembly comprising at least two rotatable gears, said gears being fixed in an engaged position relative to each other, and being attached and configured to remain in position relative to each other as said spring tension is being adjusted;
   an arm assembly mounted adjacent the second end of said support member, and configured for engaging the second end of the spring; and
   a link arm having one end attached to the arm assembly and a second end adapted to be attached to the loading arm.

4. The spring balance assembly of claim 3 wherein said first and second gears are both configured for remaining in constant engagement in an interlocked meshed arrangement.

5. The spring balance assembly of claim 4, wherein said first gear comprises a worm.

6. The spring balance assembly of claim 4, wherein said second gear comprises a disc shaped gear with a plurality of teeth on its radial face.

7. The spring balance assembly of claim 6, wherein said second gear is configured with teeth extending substantially around the entire periphery of the radial surface.

8. The spring balance assembly of claim 6, wherein said gear comprises a worm gear.

9. The spring balance assembly of claim 6 wherein said second gear comprises a stopping mechanism for preventing further rotation of said spring regulator beyond a predetermined stroke.

10. The spring balance assembly of claim 3, further comprising a case attached to said support member, said case configured for covering both the adjustment assembly and the spring.

11. The spring balance assembly of claim 4, wherein said first gear further comprises an adjustment head.

12. The spring balance assembly of claim 3, wherein said spring comprises a plurality of coils, and said spring balance assembly comprises a retainer rod longitudinally extending between said adjustment assembly and said spring arm within said coils of said spring.

13. The spring balance assembly of claim 3, wherein said adjustment assembly is configured for infinite adjustment of the first end of said spring.

14. The spring balance assembly of claim 3, further comprising a sleeve attached to said support member, said sleeve configured for covering the adjustment assembly.

15. The spring balance assembly of claim 3, wherein said support member comprises a support plate, and first and second brackets, which are laterally spaced along said support plate and projecting in a direction away from the loading arm.

16. The spring balance assembly of claim 15, wherein said adjustment assembly is configured for infinite adjustment of the first end of the spring.

17. The spring balance assembly of claim 15, wherein said spring balance assembly comprises a sleeve configured for attachment to said support member, said sleeve further configured for covering the adjustment assembly.

18. A spring balance assembly for use with a loading arm for adjusting a spring tension, said spring balance comprising:
   a support member having a first and second end;
   a spring having a first and second end;
   an arm assembly mounted adjacent the second end of said support member, and configured for engaging the second end of the spring;
   a link arm having one end attached to said arm assembly and a second end attached to the loading arm; and
   an adjustment assembly attached to the support member and configured for engaging the first end of the spring, said adjustment assembly comprising a first and second gear in an interlocked meshed arrangement.

19. The spring balance assembly of claim 18, wherein said second gear comprises a disc shaped gear with a plurality of teeth on its radial face.

20. The spring balance assembly of claim 18, wherein said first gear comprises a worm.

21. A spring balance assembly for use with a loading conduit for adjusting a spring tension, said spring balance assembly comprising:

a loading arm a support member attached to the loading arm, and having a first and second end;

a spring having a first and second end;

an arm assembly mounted adjacent the second end of said support member, and configured for engaging the second end of the spring;

a link arm having one end attached to said arm assembly and a second end attached to the loading arm; and an adjustment assembly mounted to the support member and configured for engaging the first end of the spring; said adjustment assembly having a first and second gear in an interlocked meshed orientation.

22. The spring balance assembly of claim 21, further comprising a retainer rod longitudinally extending between said adjustment assembly and said link arm within said coils of said spring.

\* \* \* \* \*

UNITED STATES PATENT AND TRADEMARK OFFICE
CERTIFICATE OF CORRECTION

PATENT NO.    :   5,983,936
DATED         :   November 16, 1999
INVENTORS     :   Schwieterman, et al.

It is certified that error appears in the above-identified patent and that said Letters Patent is hereby corrected as shown below:

In Column 12, Line 43, "claim 15" should read --claim 18--.

In Column 12, Line 46, "claim 15" should read --claim 18--.

Signed and Sealed this

Twenty-fifth Day of July, 2000

Attest:

Q. TODD DICKINSON

Attesting Officer

Director of Patents and Trademarks